(12) United States Patent
Mawatari (10) Patent No.: US 10,291,569 B2
(45) Date of Patent: May 14, 2019

(54) MESSAGE TRANSFER APPARATUS IN ELECTRONIC COMPONENT MOUNTING SYSTEM

(71) Applicant: Panasonic Corporation, Osaka (JP)

(72) Inventor: Michiaki Mawatari, Yamanashi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 351 days.

(21) Appl. No.: 14/295,515

(22) Filed: Jun. 4, 2014

(65) Prior Publication Data

US 2015/0012601 A1 Jan. 8, 2015

(30) Foreign Application Priority Data

Jul. 3, 2013 (JP) ................. 2013-139428

(51) Int. Cl.
*H04L 12/58* (2006.01)
(52) U.S. Cl.
CPC ................... *H04L 51/24* (2013.01)
(58) Field of Classification Search
CPC ..................................... H04L 51/24
See application file for complete search history.

(56) References Cited

U.S. PATENT DOCUMENTS

| | | | |
|---|---|---|---|
| 2005/0039614 A1* | 2/2005 | Konishi | G01G 19/393 99/486 |
| 2005/0188037 A1* | 8/2005 | Hamaguchi | G06Q 10/107 709/206 |
| 2005/0223057 A1* | 10/2005 | Buchheit | G06Q 10/107 709/203 |
| 2006/0039707 A1* | 2/2006 | Mima | B41J 2/17546 399/23 |
| 2011/0231499 A1* | 9/2011 | Stovicek | H04M 1/72547 709/206 |
| 2013/0159877 A1* | 6/2013 | Banti | G06Q 10/107 715/752 |

(Continued)

FOREIGN PATENT DOCUMENTS

| | | | |
|---|---|---|---|
| CN | 1764167 A | | 4/2006 |
| GB | 2493876 | * | 5/2010 |
| JP | H11-109602 A | | 4/1999 |

(Continued)

*Primary Examiner* — Krista M Zele
*Assistant Examiner* — Mohammad Yousuf A. Mian
(74) *Attorney, Agent, or Firm* — Pearne & Gordon LLP (57) ABSTRACT

A message transfer apparatus in an electronic component mounting system including: a message registration section that registers a message; a message storing section that stores the registered message; a message output section that outputs the stored message to a display section; a message notification timing setting section that sets timings where the message is to be notified in accordance with timings for an operator to be shifted with another; a message-to-be-notified extraction section that extracts a message to be notified from the message storing section at a timing where the message is to be confirmed; and an unconfirmed message notification section that causes a notification section to carry out a notification regarding presence of an unconfirmed message when there is any message which has not been output among the extracted message.

6 Claims, 10 Drawing Sheets

(56) References Cited

U.S. PATENT DOCUMENTS

2014/0378082 A1* 12/2014 Ros .................. H04W 4/22
                                                  455/404.1
2016/0121223 A1*  5/2016 Kobayashi ......... G06Q 10/107
                                                   463/29

FOREIGN PATENT DOCUMENTS

| JP | 2004-004035 A   | 1/2004  |
| JP | 2005-275514 A   | 10/2005 |
| JP | 2005-353847 A   | 12/2005 |
| WO | 2011/148410 A1  | 12/2011 |

* cited by examiner

| MESSAGE LIST DISPLAY SCREEN | | | | |
|---|---|---|---|---|
| REGISTERED TIME AND DATE | MESSAGE | FACILITY (PLACE) | ALREADY-READ PRO-CESSING | STATE |
| YYYY/MM/DD hh:mm | A COVER OF A FEEDER NO. 14 IS HARD TO BE CLOSE ... | 001003 | AUTOMATIC | NEW |
| YYYY/MM/DD hh:mm | DUST IS EASY TO BE STUCK TO A BOARD CONVEYING BELT ... | 001003 | AUTOMATIC | NEW |
| YYYY/MM/DD hh:mm | A FEEDER NO. 27 BORROWED FROM LINE #6... | 002004 | MANUAL | REREAD |
| YYYY/MM/DD hh:mm | DO NOT USE A SLOT NO. 11 BECAUSE OF POOR CONTACT ... | 001003 | AUTOMATIC | REREAD |
| YYYY/MM/DD hh:mm | ABNORMAL NOISE OCCURS AT THE TIME OF REPLACING A NOZZLE. SERVICE PERSON ... | 002002 | AUTOMATIC | REREAD |
| | | 002001 | AUTOMATIC | ALREADY-READ |

CLOSE

MESSAGE TRANSFER APPARATUS IN ELECTRONIC COMPONENT MOUNTING SYSTEM

CROSS REFERENCE TO RELATED APPLICATION(S)

The present disclosure relates to the subject matters contained in Japanese Patent Application No. 2013-139428 filed on Jul. 3, 2013, which are incorporated herein by reference in its entirety.

FIELD

Embodiments of the present invention relate to a message transfer apparatus in an electronic component mounting system for mounting an electronic component on a board.

BACKGROUND

A manufacturing factory for manufacturing a mounting board, which is a substrate having electronic components mounted thereon, has used an electronic component mounting system provided with mounting lines in which a conveyer connects a plural apparatuses together such as a screen printing apparatus for printing solder on a board, an electronic component mounting apparatus for placing electronic components on a board and so on. In a mounting board manufacturing factory, operators (workers) are deployed for supplying members to the mounting line and addressing troubles so as to bring the mounting line into operation. In order to address the operation of the mounting line for 24 hours, working hours of a day are segmented into a plurality of time periods to shift an operator with another.

An appropriate operation of the mounting line can be secured by the operator's messages being transferred to a next operator at the time of changing the shift with others. The messages might be information on the operation status of the mounting line, a status regarding occurrence of troubles, and so on. Although such a message is generally given through medium such as a sheet of paper, an apparatus also has been proposed in which a message is transferred by means of text data or voice data, those input by a terminal, as disclosed in Patent Documents 1 and 2.

Patent Document 1 is JP-A-2004-4035. And Patent Document 2 is WO2011/148410.

SUMMARY

A manufacturing factory where a mounting line is operated for 24 hours often employs a working arrangement in which operators are rotated in three shifts a day, and thus a quite number of messages is created which have to be transferred not only to the next operator, but also to an operator subsequent to the next one depending on the contents of the message. However, those disclosed in Patent Documents 1 and 2 have been less than practical in a manufacturing factory which employs the working shifts rotating three times in a day.

Therefore, this disclosure aims to provide a message transfer apparatus in an electronic component mounting system capable of securely transferring a message in the electronic component mounting system used in a mounting line.

According to an embodiment of the present invention, there is provided a message transfer apparatus in an electronic component mounting system for mounting electronic components on a board. The apparatus includes: a message registration section that registers a message; a message storing section that stores the message registered by the message registration section; a message output section that outputs the message stored in the message storing section to a display section; a message notification timing setting section that sets a plurality of timings where the message is to be notified in accordance with timings for an operator in charge of the electronic component mounting system to be shifted with another operator; a message-to-be-notified extraction section that extracts a message that is to be notified from the message storing section at a timing where the message is to be confirmed; and an unconfirmed message notification section that causes a notification section to carry out a notification regarding presence of an unconfirmed message when there is any message which has not been output by the message output section among the extracted message extracted by the message-to-be-notified extraction section.

According to the embodiments of the present invention, a message that is to be transferred is extracted from a message storing section at the timing of the message being confirmed, and a notification section alerts a notification such that there is an unconfirmed message in the extracted message, if the message was not output by a message output section. Therefore, it is possible to securely transfer an operator a message.

DETAILED DESCRIPTION OF THE EMBODIMENTS

First, an overall structure of an electronic component mounting system according to an explanatory embodiment of the present invention will be described with reference to FIG. 1. An electronic component mounting system 1 has a function of mounting electronic components on a board, and is structured so that a host system 3 and a plurality of (two in this case) mounting lines 4A and 4B are communicatively connected with each other through a communication network 2 with a wired or wireless configuration. The host system 3 has a computing processing function to collectively control a plurality of mounting line facilities constituting the mounting lines 4A and 4B.

A production site such as a manufacturing factory may take a form of operating the mounting lines 4A and 4B for 24 hours under the supervision of an operator. In such a case, a so-called shift work system is employed in which operators work in turn for each of three or more time periods provided by dividing 24 hours into more than one period, so that three or more operators are rotated in a day. In order to address the shift work system, the electronic component mounting system 1 has a message transfer function for transferring a next operator a message of the operation status of each mounting line, the status regarding occurrence of troubles, etc.

Next, the mounting lines 4A and 4B will be described. The mounting lines 4A and 4B are structured by connecting mounting line facilities including a board feeding apparatus M1, a printer M2, mounters M3, M4 and M5, a reflow apparatus M6 and a board collection apparatus M7. The board feeding apparatus M1 is arranged at the forefront of the mounting lines 4A and 4B so as to feed a board to be produced to the printer M2. The printer M2 prints a paste such as solder on an electrode formed on the board. The mounters M3, M4 and M5 place electronic components on the board after the solder is printed. The reflow apparatus M6 applies heat to the board on which the electronic components have been placed in accordance with a predetermined temperature profile so that the electronic components and the board are solder joined. The board collection apparatus M7 collects the board carried from the reflow apparatus M6.

Figure 2:
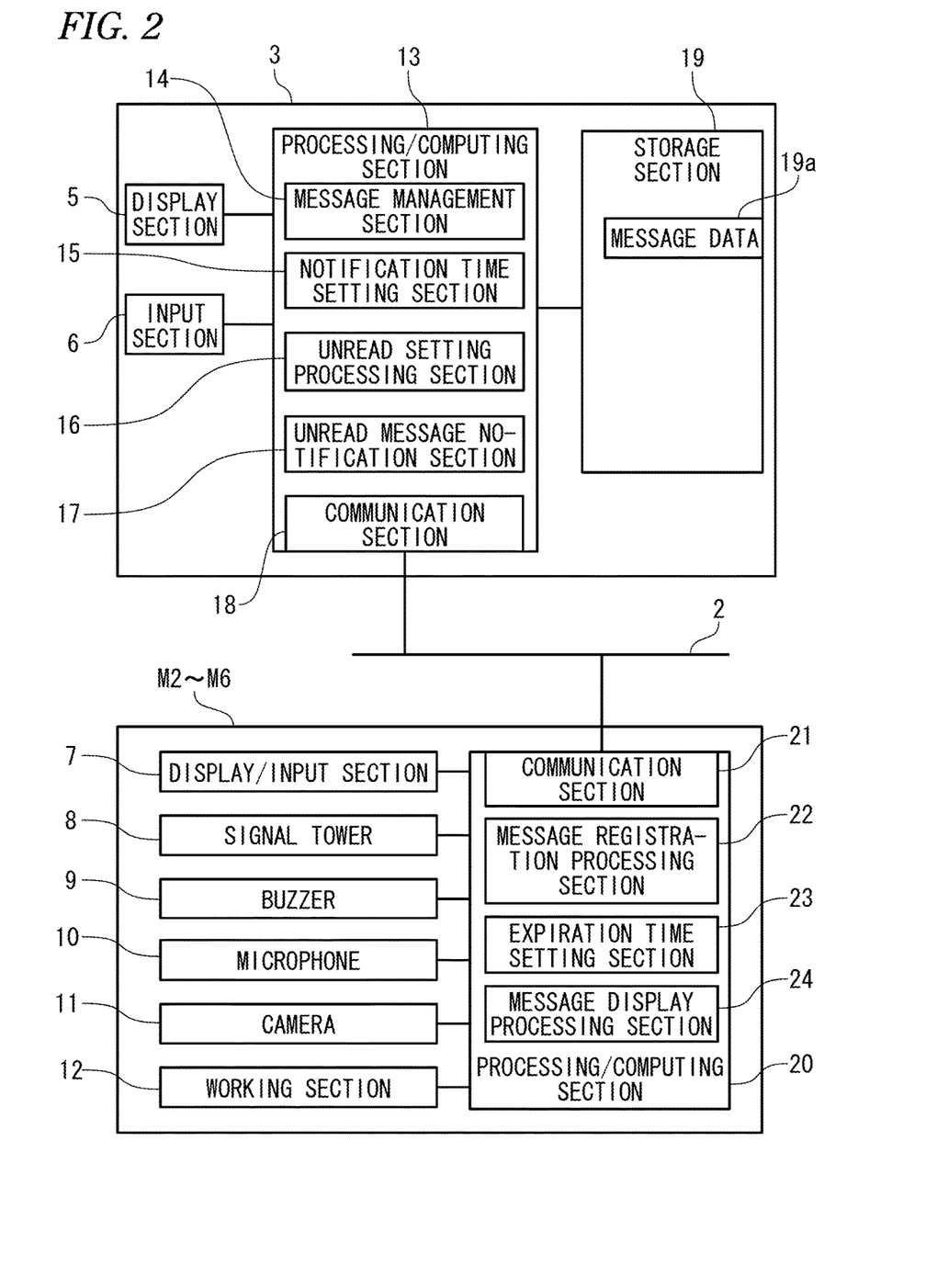
FIG. 2 is a block diagram showing a structure of a control system of an electronic component mounting system according to the embodiment of the present invention.

Next, the host system 3 and the mounting line facilities M2 to M6 will be described in detail with reference to FIG. 2. The host system 3 is provided with a display section 5 and an input section 6. The display section 5 is a display section of a monitor and the like to display a variety of information such as information required for the operation of the mounting line facilities M1 to M7 of the mounting lines 4A and 4B, the operation status, etc. Furthermore, a guidance screen is displayed at the time when the operator operates the message such as confirming or editing the message registered in the mounting line facilities M2 to M6. The input section 6 is an input section, such as a keyboard and a mouse, which executes the operations such as requesting the display of a message, inputting letters, numeric characters, symbols and the like at the time of editing, switching the guidance screen, etc.

Each of the mounting line facilities M2 to M6 is provided with a display/input section 7, a signal tower 8, a buzzer 9, a microphone 10, a camera 11 and a working section 12. The display/input section 7 (refer to FIG. 1) is a display/input section such as a touch panel, etc., which displays operation screens and a variety of information required for the operation of the mounting line facilities M2 to M6. Furthermore, the display/input section 7 is operated by the operator to input letters, numeric values, symbols and the like, create a message, register a message, make a request for displaying a message, etc. Furthermore, when there is a message which has not been confirmed by the operator (hereinafter referred to as "unread message"), the content thereof is displayed.

Figure 1:
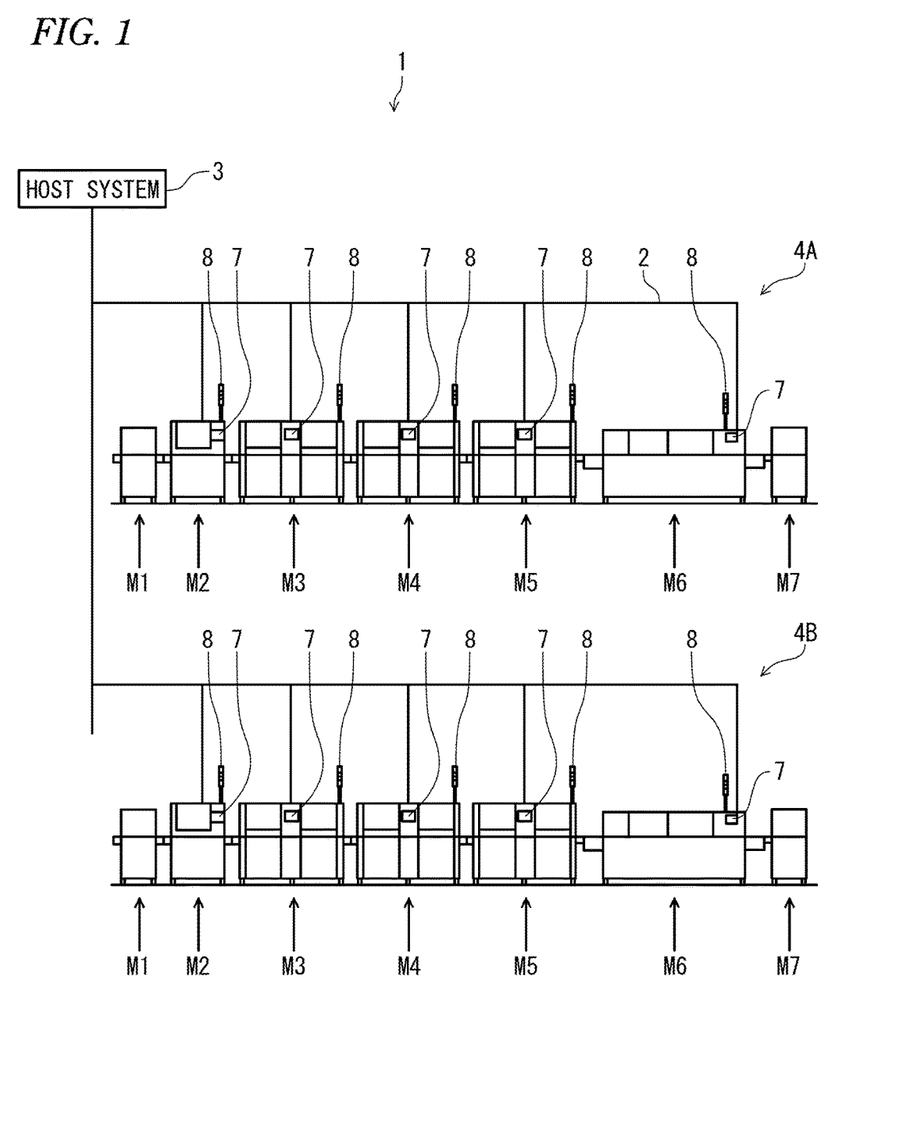
FIG. 1 is an overall structural diagram of an electronic component mounting system according to an embodiment of the present invention.

The signal tower 8 is provided uprightly on the top surface of a covering member which covers the mounting line facilities M2 to M6 (refer to FIG. 1). The signal tower 8 is provided with a warning light to provide the operator with a notification regarding the suspension due to shortage of material, troubles and the like, or a variety of warnings using the warning light. Furthermore, the warning light is also used to make a notification by lighting it that there is an unread message in each of the mounting line facilities M2 to M6. The buzzer 9 is an alarm generation apparatus which generates an alarm to make a notification when a notification or warning is required, similar to the signal tower 8.

The microphone 10 is used at the time of creating a voice message. The mounting line facilities M2 to M6 are provided with a speaker, and the voice-registered message is reproduced through the speaker. The camera 11 is used at the time of creating a message by moving images. The working section 12 constitutes a mechanism of mounting a variety of components which mounts electronic components on a board in the mounting line facilities M2 to M6.

Next, the structure of a control system in the electronic component mounting system 1 will be described focusing on a message transfer function with reference to FIG. 2. The host system 3 is provided with a processing/computing section 13 which has, as internal processing functions, a message management section 14, a notification time setting section 15, an unread setting processing section 16, an unread message notification processing section 17 and a communication section 18. Furthermore, the processing/computing section 13 is connected to a storage section 19, the display section 5 and the input section 6.

Each of the mounting line facilities M2 to M6 is provided with a processing/computing section 20, and has, as internal processing functions, a communication section 21, a message registration processing section 22, an expiration time setting section 23 and a message display processing section 24. Furthermore, the processing/computing section 20 is connected to the display/input section 7, the signal tower 8, the buzzer 9, the microphone 10, the camera 11 and the working section 12. The communication section 18 of the host system 3 is connected to the communication section 21 of the mounting line facilities M2 to M6 through the communication network 2, thereby carrying out the data communication therebetween.

The message management section 14 manages a message data 19a containing information on a message stored in the storage section 19. More specifically, the message management section 14 carries out a variety of processing regarding the message data 19a such as reading out of the message data 19a from the storage section 19, editing, displaying on the display section 5, as well as reproducing the message using voice or moving images if it is contained in the message data 19a.

The notification time setting section 15 sets a plurality of notification times (notification timing) for carrying out processing to notify the mounting line facilities M2 to M6 of the message. The notification time is set to be the time when a message is to be confirmed by an operator who works in each time period provided by dividing 24 hours into more than one period, e.g., the time to start each time period when an operator changes the shift with others, or the time thereon or thereabout. More specifically, the notification time can be restated as a message confirmation time for the operator to confirm the message. In this manner, the notification time setting section 15 is a message notification timing setting section that sets a plurality of timings where the message is to be notified in accordance with timings for an operator in charge of the electronic component mounting system 1 to be shifted with another operator. The time period segmented by setting a plurality of notification times will be hereinafter referred to as a "shift".

The unread setting processing section 16 extracts one or more messages for which the notification processing is to be executed at the set notification time from the message data 19*a*, and sets the extracted message to be in "unread" state. It is determined, based on the state of the message contained in the message data 19*a* when the notification time has come, whether or not the message is extracted (a detailed explanation will follow). In this manner, the unread setting processing section 16 is a message-to-be-notified extraction section that extracts a message that is to be notified at the timing where the message is to be confirmed from the storage section 19.

When the message data 19*a* contains a message which is set to be in the "unread" state by the unread setting processing section 16 at a predetermined notification time, the unread message notification processing section 17 executes the processing to notify the target mounting line facilities M2 to M6 of that interest through the communication section 18.

The storage section 19 stores the message data 19*a*. The message data 19*a* contains the registered time and date of the message, the contents of the message, information identifying the mounting line facilities M2 to M6 in which the message has been registered, the state of the message, etc. Furthermore, when the message data 19*a* is edited in the message management section 14, the storage section 19 stores the message data 19*a* after edited.

The message registration processing section 22 executes the processing for registering the message created in the mounting line facilities M2 to M6 through the display/input section 7, the microphone 10 and the camera 11. The registered message is stored in the storage section 19 in the host system 3 as one piece of information contained in the message data 19*a*. In this manner, the message registration processing section 22 is a message registration section that registers a message. Furthermore, the storage section 19 is a message storing section that stores the message registered by the message registration section.

The expiration time setting section 23 sets an expiration time for each message registered by the message registration processing section 22. The expiration time is a defined limit for carrying out the notification processing of the registered message, and is set to be the same time as one notification time among a plurality of notification times. The registered message is associated with the expiration time, and then stored in the storage section 19. In this manner, the expiration time setting section 23 is an expiration time setting section that sets the expiration time of message for each message. The way of setting the expiration time will be described below.

The message display processing section 24 outputs the message contained in the message data 19*a* stored in the storage section 19 to the display/input section 7 to display it thereon. The term of display used herein includes a text-based display as well as reproduction of voices and moving images. More specifically, when the message is created by text, the text is displayed on the display/input section 7. Moreover, a voice is reproduced through the speaker when the message is created with voice, and moving images are reproduced on the display/input section 7 when the message is created by moving images. The message is displayed by a display request from the display/input section 7 operated by the operator. In this manner, the message display processing section 24 is a message output section that outputs the message stored in the storage section 19 to the display/input section 7 (the display section).

Figure 3:
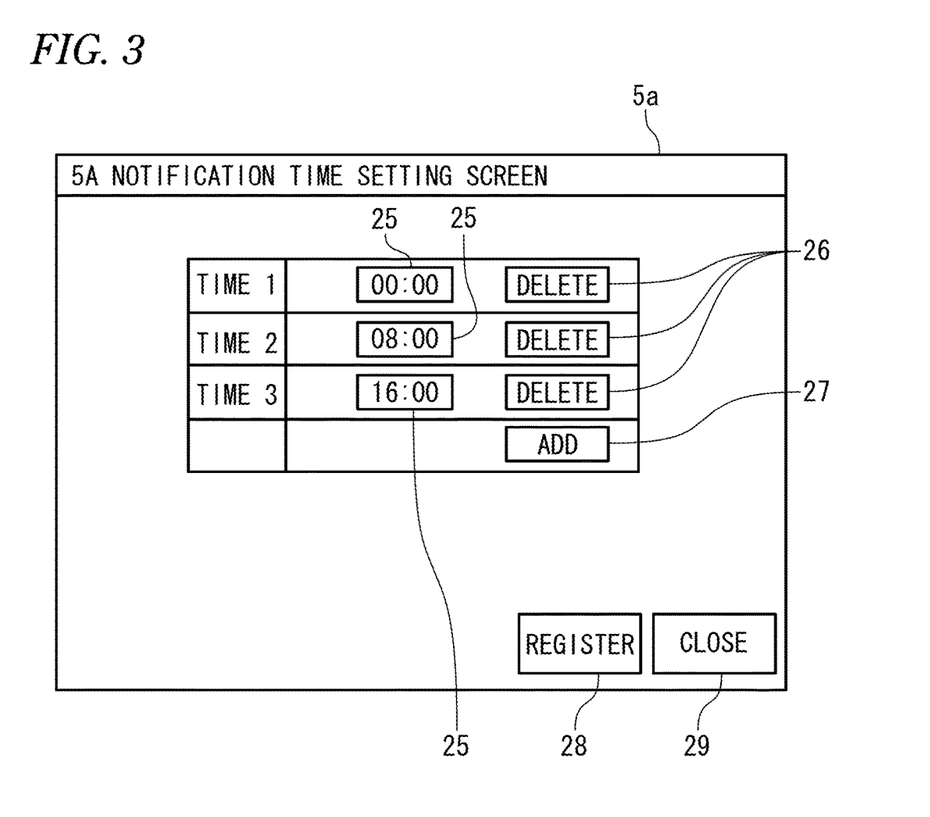
FIG. 3 is an explanatory view of a notification time setting screen according to the embodiment of the present invention.

Next, with reference to FIG. 3, the explanation will be made regarding a notification time setting screen 5*a* displayed on the display section 5 of the host system 3 when the notification time setting section 15 is started up. The notification time setting screen 5*a* is a guidance screen at the time of setting a plurality of notification times, in which "time setting field" 25 is provided for each of time 1, time 2, time 3, . . . time n. The notification time is set by the operator inputting a desired time in the "time setting field" 25 of time n (n=1, 2, 3 . . . ), and then operating (clicking) "registration" 28 displayed on the screen.

The operation of "delete" 26 displayed on the same row as the "time setting field" 25 deletes time n corresponding thereto to reduce the number of notification time. Furthermore, the operation of "add" 27 displayed on the screen adds new time n to increase the number of notification time. In the example shown in FIG. 3, the "add" 27 is operated, so that the "time setting field" 25 is newly displayed for setting the fourth notification time (time 4). Any number of the notification time can be set within the range of 24 hours. In order to terminate the notification time setting screen 5*a*, "close" 29 displayed on the screen is operated.

Figure 4:
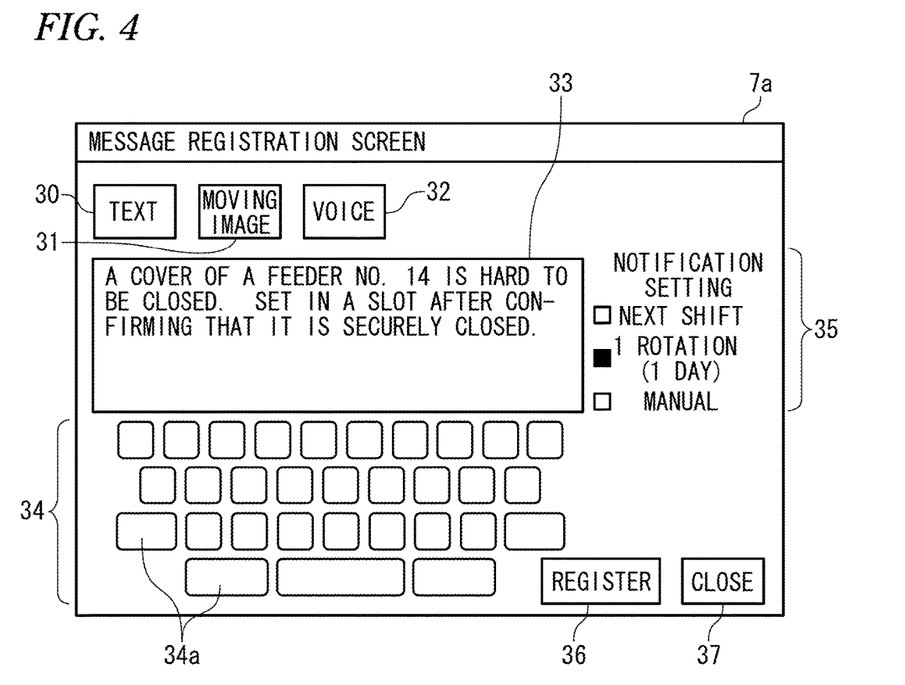
FIG. 4 is an explanatory view of a message registration screen according to an embodiment of the present invention.

Next, a message registration screen 7*a* displayed on the display/input section 7 of each of the mounting line facilities M2 to M6 will be described with reference to FIG. 4. The message registration screen 7*a* is a guidance screen at the time of creating and registering a message in each of the mounting line facilities M2 to M6, which includes displays of "text" 30, "moving image" 31, "voice" 32, "message display field" 33, "keypad" 34, "notification setting" 35, "register" 36 and "close" 37.

The "text" 30 is an operation switch at the time of creating a message by text. The text-based message is created through the "message display field" 33 and the "keypad" 34. The "message display field" 33 displays letters, numeric characters, symbols and the like input using the "keypad" 34. The "keypad" 34 acts as an input section with a plurality of rows of input keys 34*a* arranged for inputting letters, numeric characters, symbols and the like. A desired input key 34*a* is operated after the operation of the "text" 30, so that a letter and the like corresponding thereto is displayed on the "message display field" 33, thereby creating a sentence.

The "moving image" 31 is an operation switch at the time of creating a message by moving images. The operation of the "moving image" 31 activates the camera 11, so that moving images can be taken. The "voice" 32 is an operation switch at the time of creating a message by voice. The operation of the "voice" 32 activates the microphone 10, so that a voice can be recorded.

The "notification setting" 35 is a guidance screen for setting a message notification aspect, which includes displays of "next shift", "1 rotation (1 day)" and "manual", and also a display of a check box corresponding to each of the displays. The operation of a desired check box by the operator turns the inside of the check box into black, so that one selected notification mode is set.

When the "next shift" is selected, the message notification processing is carried out at the notification time that is set to be the same time as the timing to start the time period started from the notification time that will firstly come after the message is registered, i.e., the next shift. In other words, the expiration time for the message is set to be the notification time subsequent to next one counted from the time point at which the message has been registered. For example, when the notification times are set to "midnight", "eight" and "sixteen" (refer to FIG. 3), and the message is registered between "midnight" and "eight", the expiration time is set to "sixteen" which corresponds to the notification time subsequent to next one counted from the time point at which the message has been registered.

When the "1 rotation (1 day)" is selected, the message notification processing is carried out at a plurality of notification times that comes during a period from a shift in which the message has been registered to the time when a shift before the shift concerned is finished, e.g., until one rotation is finished regarding 24 hours (1 day) as one rotation. In other words, the notification time immediately before the message has been registered is set as the expiration time of the message. Applying this to the example described above, when the message is registered between "midnight" and "eight", the expiration time is set to be "midnight" which corresponds to the notification time immediately before the message has been registered. In this manner, the "notification setting" 35 acts as a guidance screen for setting the expiration time of the message.

When the "manual" is selected, the expiration time of the message is not set, but it is determined by the operator who works in each shift whether or not the notification processing for the message will be carried out at the next notification time. Applying this to the example described above, when a message is registered between "midnight" to "eight", the notification processing for the message is carried out at "eight" which is the next notification time. It is, however, up to the decision by the operator who works in the shift from "eight" to "sixteen" whether or not the notification processing for the message is carried out at "sixteen" which is the notification time subsequent to next one.

As described above, the message registration screen 7a makes it possible to create a message and carry out the notification setting. Then, the operator operates the "register" 36, so that the message registration processing described below is carried out. In addition, the message can be created by a combination of text, moving images and voices. For example, text is created in the first place and the "voice" 32 is operated to record a voice, followed by the operation of the "register" 36, thereby enabling one message containing both text and voice to be registered. In order to terminate the message registration screen 7a, the "close" 37 is operated.

Figure 5:
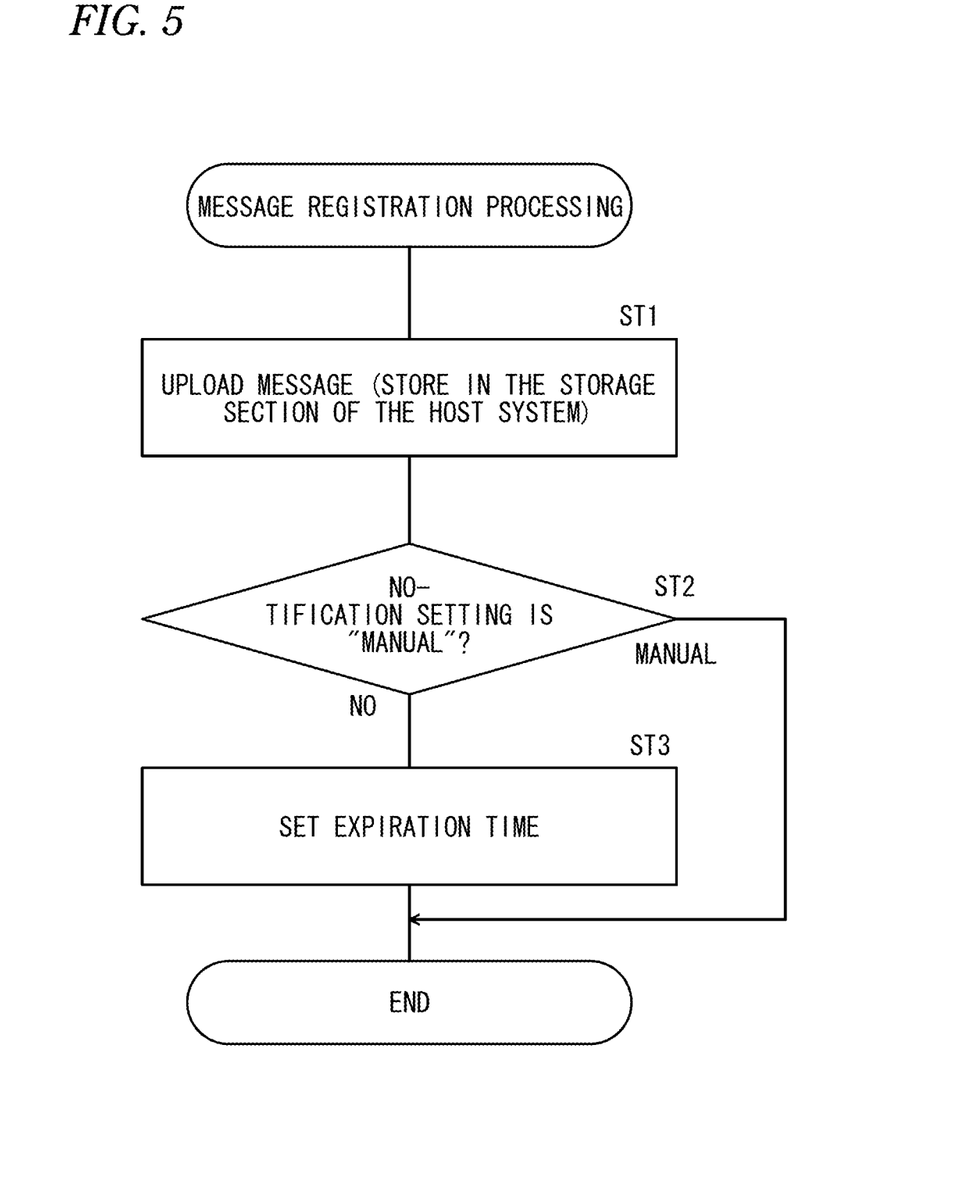
FIG. 5 is a flow diagram showing message registration processing according to an embodiment of the present invention.

Next, a flow of the message registration processing will be described with reference to FIG. 5. When the "register" 36 in the message registration screen 7a is operated, the message registration processing is carried out by the message registration processing section 22. First, the message registration processing section 22 makes a message created through the message registration screen 7a into data to upload it to the host system 3 (Step ST1: a message upload step). The uploaded message is stored in the storage section 19. Then, the message registration processing section 22 determines whether the notification setting for the uploaded message is "manual" (Step ST2: a notification setting determination step). More specifically, it is determined here whether or not the "manual" is selected in the "notification setting" 35 on the message registration screen 7a. If the "manual" is selected, the message registration processing is terminated without setting the expiration time.

On the contrary thereto, if the notification setting is not the "manual" but any of the "next shift" or the "1 rotation (1 day)", the expiration time is set (Step ST3: an expiration time setting step). More specifically, when the "next shift" is selected, the expiration time setting par 23 sets the expiration time to be the notification time subsequent to next one counted from the time point at which the message has been registered. In contrast, when the "1 rotation (1 day)" is selected, the expiration time setting section 23 sets the notification time immediately before the message has been registered as the expiration time. The message registration processing is terminated after the expiration time is set.

Figure 6:
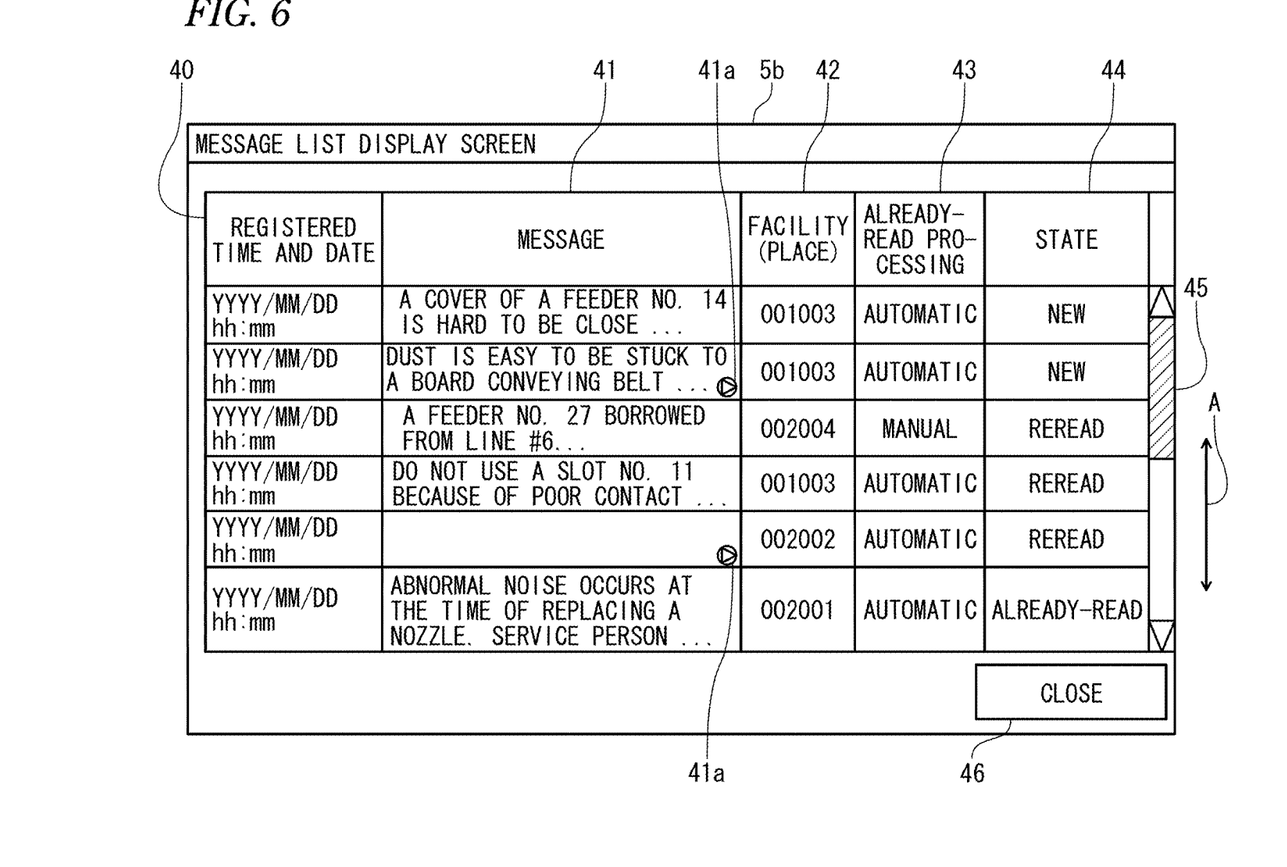
FIG. 6 is an explanatory view of a message list display screen according to the embodiment of the present invention.

Next, a message list display screen 5b displayed on the display section 5 of the host system 3 will be described with reference to FIG. 6. The message list display screen 5b displays a list of a variety of information contained in the message data 19a stored in the storage section 19. More specifically described, the message list display screen 5b displays information containing "registered time and date" 40, "message" 41, "facility (place)" 42, "already-read processing" 43 and "state" 44, in which one row corresponds to one message.

The "registered time and date" 40 displays time and date in which the message has been registered by executing the message registration processing. In the present embodiment, "Year (YYYY)", "month (MM)", "day (DD)" and "time (hh:mm)" are displayed. The "message" 41 displays the content of the message created and registered in the mounting line facilities M2 to M6. When the message contains text, the "message" 41 displays the beginning of the text. The screen on which the text is to be displayed is operated, so that full text is displayed and also the text can be edited. Furthermore, when the message contains voices or moving images, a reproduction button 41a is displayed on the "message" 41. The reproduction button 41a is operated, so that the voice is reproduced through the speaker provided in the host system 3, and also the moving images are reproduced on the screen of the display section 5.

The "facility (place)" 42 displays identification information for specifying the mounting line facilities M2 to M6 in which the message is registered. The mounting line facilities M2 to M6 in which the message is registered become a target of the notification processing by the unread message notification processing section 17. Therefore, it can be said that the identification information for the "facility (place)" 42 is also information for specifying the mounting line facilities M2 to M6 to be a target of the notification processing.

The "already-read processing" 43 displays information on the notification setting of the message. More specifically, when the notification setting is "manual", the "manual" is displayed in the "already-read processing" 43. When the notification setting of the message is "next shift" or "1 rotation (1 day)", "automatic" is displayed in the "already-read processing" 43.

The "state" 44 displays a current state of the message, in which any of "new", "reread", "already-read" or "unread" is displayed. The "new" shows the state where the message has been registered in the current shift as well as the notification processing has not been conducted at all. The "reread" shows the state where the notification processing for the message will be conducted at the next notification time as well as the operator who is working in the current shift has already confirmed the message. More specifically, the "reread" is displayed with regard to the message to be expired at the notification time subsequent to next one and those which come thereafter. The "already-read" shows the state where the notification processing for the message will not be conducted at the next notification time as well as the operator who is working in the current shift has already confirmed the message. More specifically, the "already-read" is displayed with regard to the message to be expired at the next notification time. The "unread" shows the state where the message has undergone the notification processing for the message has been conducted at the immediately previous notification time, whereas the operator who is working in the current shift has not confirmed the message.

As described above, the information containing the "registered time and date" 40, the "message" 41, the "facility" 42, the "already-read processing" 43 and the "state" 44 is displayed as the message data 19*a* on the message list display screen 5*b*. In addition, a scroll bar 45 displayed on one side (right side on the paper) of the screen is scrolled upward and downward (an arrow A), so that the information hidden in the margin of the screen can be displayed. In order to terminate the message list display screen 5*b*, the "close" 46 displayed on the screen is operated.

Figure 7:
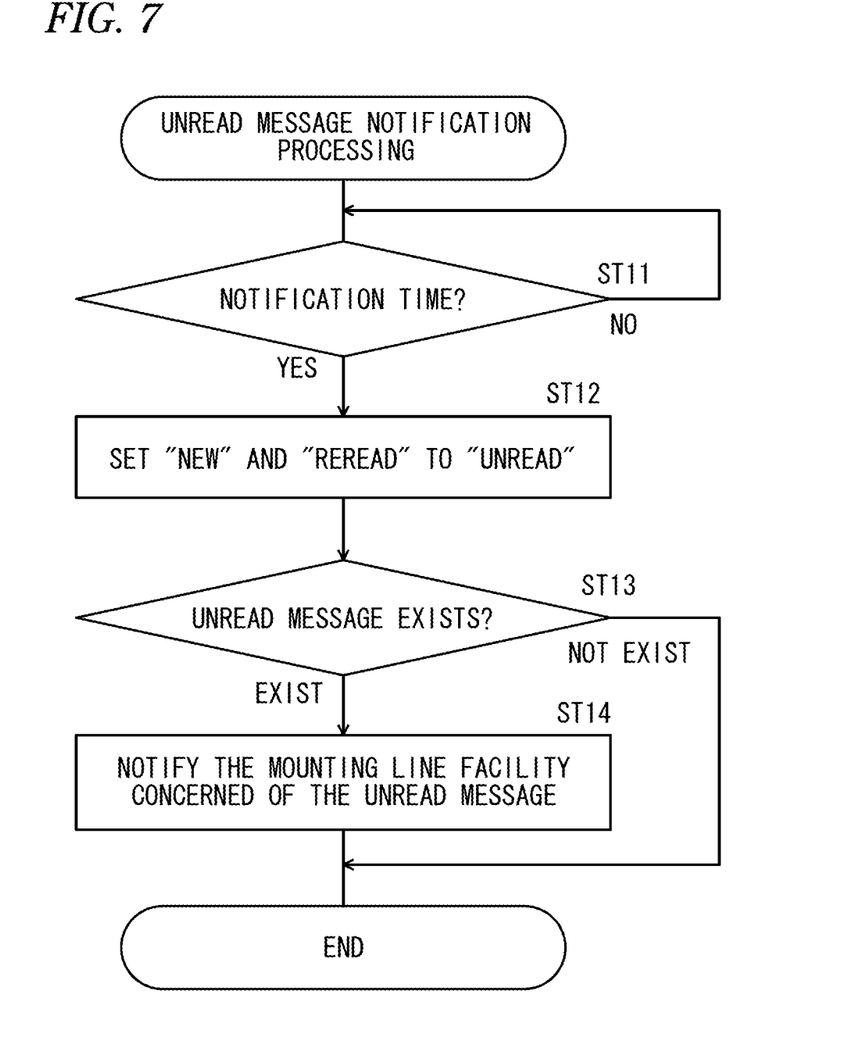
FIG. 7 is a flow diagram of unread message notification processing according to the embodiment of the present invention.

Next, the description will be made regarding a flow of unread message notification processing executed in the host system 3 in order to notify the mounting line facilities M2 to M6 of the presence of an unread message with reference to FIG. 7. First, the unread setting processing section 16 determines whether the notification time has come (Step ST11: a notification time determination step). If the notification time has come, the unread setting processing section 16 extracts a message to which the notification processing is to be conducted at that set notification time from the message data 19*a*, and sets the extracted message to be "unread" (Step ST12: an unread setting processing). Here, the extraction is done for only the message which is in the "new" or "reread" state in the message data 19*a*, and thus the message in the "already-read" state is not extracted.

Then, the unread message notification processing section 17 confirms whether or not there is a message which has been set to be "unread" in the unread setting step at Step ST12 (Step ST13: an unread message confirmation step). If there is any unread message, the processing is carried out to notify the mounting line facilities M2 to M6 to which the message is to be given of that interest (Step ST14: an unread message display/notification step), thereby terminating the unread message notification processing. On the contrary, if there is no message which has been set to be "unread", the unread message notification processing is terminated without executing the notification processing.

Figure 8:
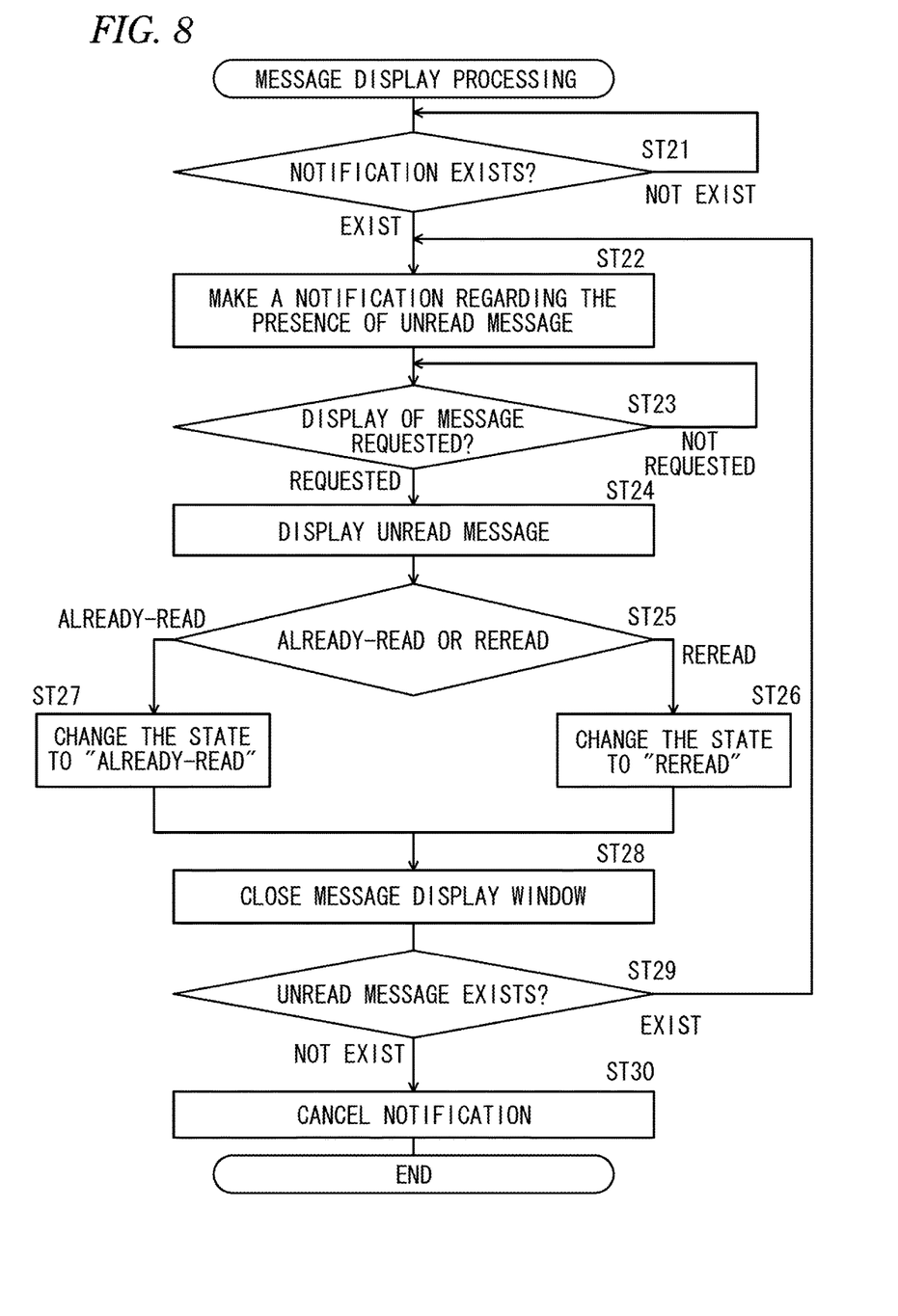
FIG. 8 is a flow diagram of message display processing according to the embodiment of the present invention.

Next, the description will be made regarding a message display processing executed in the mounting line facilities M2 to M6 in order to display a message to an operator with reference to FIG. 8. First, the message display processing section 24 determines the presence of a message from the unread message notification processing section 17 (Step ST21: a presence-of-unread-message determination step). More specifically, the message display processing section 24 determines, based on the presence of the message concerned, whether or not there is any message that is set to be "unread" with regard to that mounting line facility.

If there is no message at Step ST21, the message display processing section 24 enters into the standby state in which the processing of Step ST21 is repeated until next notification is issued. If there is a message, a presence-of-unread-message notification step (Step ST22) is executed. In the presence-of-unread-message notification process, the message display processing section 24 makes a notification of the presence of the unread message to the operator by using a notification section composed of the display/input section 7, the signal tower 8, the buzzer 9, etc.

Then, the message display processing section 24 determines whether or not a request for displaying the message is made from the operator after the notification at Step ST22 (Step ST23: a message display request determination step). The determination here is made based on whether or not the message that is set to be "unread" is displayed through the operation of the display/input section 7 by the operator. When the request for displaying the message is made, the message display processing section 24 reads out the message of interest from the message data 19*a*, and displays a message display window 7*b* containing information on the message concerned (FIGS. 9A to 9C) (Step ST24: an unread message display step). At this time, the display of the message display window 7*b* varies depending on the presence of the setting of the expiration time and the set expiration time.

Figure 9A:
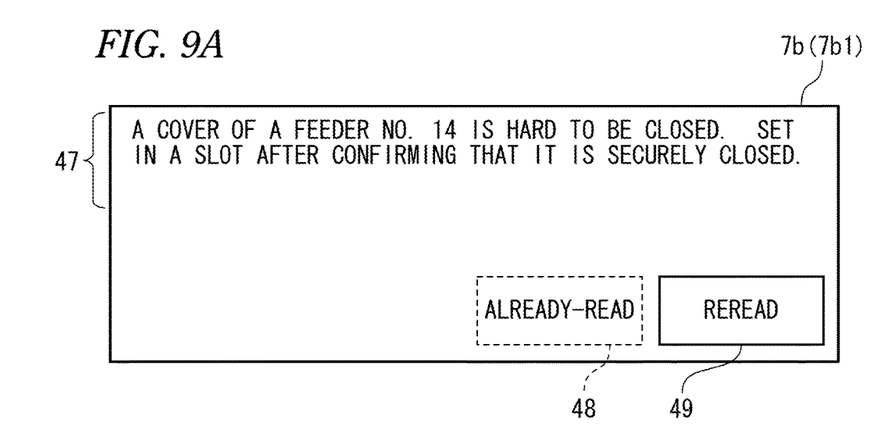
FIGS. 9A, 9B and 9C are explanatory views of message display windows according to the embodiment of the present invention.

Here, the message display window 7*b* which is displayed on the display/input section 7 will be described with reference to FIGS. 9A to 9C. Information displayed on common irrespective of the setting status of the expiration time will be described for the first place. The message display window 7*b* displays information containing "message display field" 47, "already-read" 48 and "reread" 49. The "message display field" 47 displays a message for which a request for displaying is made. When the message contains text, the text is displayed. When the message contains voices or moving images, a reproduction button is displayed (refer to the "reproduction button 41" shown in FIG. 6).

The "already-read" 48 is an operation switch for changing the state of the displayed message from "unread" to "already-read". More specifically, the operation of the "already-read" 48 changes the state of the message data corresponding to the message displayed on the "message display field" 47 among the message data 19*a* in the storage section 19 from "unread" to "already-read". This reduces one "unread" message in the message data 19*a* in the storage section 19. The message which has been changed to be "already-read" is excluded from a target to be extracted by the unread setting processing section 16 at the notification time coming next and subsequent thereto.

The "reread" 49 is an operation switch for changing the state of the displayed message from "unread" to "reread". More specifically, the operation of the "reread" 49 changes the message data corresponding to the message displayed on the "message display field" 47 among the message data 19*a* in the storage section 19 from "unread" to "reread". This reduces one message set to be "unread" in the message data 19*a* in the storage section 19. The message which has been changed to be "reread" again becomes a target to be extracted by the unread setting processing section 16 at the next notification time.

Next, a display aspect will be described regarding the message display window 7*b* corresponding to the setting status for the expiration time. FIG. 9A shows a message display window 7*b*1 which is displayed in the case where the expiration time of the displayed message will expire the notification time subsequent to next one and those which come thereafter. In the message display window 7*b*1, the "already-read" 48 is in an inactive state (shown in broken lines) which does not react as an operation button. More specifically, only the operation of the "reread" 49 is allowed on this screen. This means that the displayed message is one for which the notification processing is to be conducted at the next notification time, i.e., one that should be transferred also to an operator who is to work in the next shift.

When detecting the operation of "reread" 49 by the operator in the case where the message is displayed with the display aspect of the message display window 7*b*1 (Step ST25: an already-read/reread input detection step), the message display processing section 24 changes the state of message from "unread" to "reread" (Step ST26: a first message state changing step). The message changed to be "reread" is again set to be "unread" by the unread setting processing section 16 at the next notification time, and becomes a target of the notification processing by the unread message notification processing section 17. The message that has been a target of the notification processing becomes a target of notification in the nest shift.

Figure 9B:
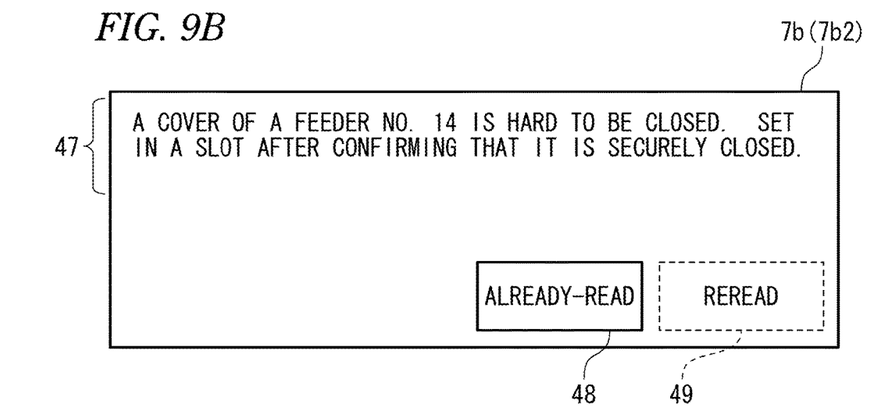

FIG. 9B shows a message display window 7b2 in the case where the expiration time of the displayed message will expire at the next notification time. In the message display window 7b2, the "already-read" 48 is in an active state, and the "reread" 49 is in an inactive state. This means that the displayed message is one to which the notification processing has not to be conducted at the next notification time, i.e., one that is not needed to be transferred to an operator who is to work in the next shift. When detecting the operation of "already-read" 48 by the operator in the case where the message is displayed with the display aspect of the message display window 7b2 (Step ST25: an already-read/reread input detection step), the message display processing section 24 changes the state of the message concerned to "already-read" (Step ST27: a second message state changing step). The message changed to be "already-read" is not extracted by the unread setting processing section 16 at the next notification time. Therefore, it is excluded from a target of the notification processing by the unread message notification processing section 17, and the notification is not made in the next shift. In this manner, the message display processing section 24 also acts as a message setting section that sets the message, from among the messages output on the screen of the display/input section 7, whose set expiration time will expire at the next timing where the message is to be confirmed not to be notified as the message to be extracted by the message-to-be-notified extraction section.

Figure 9C:
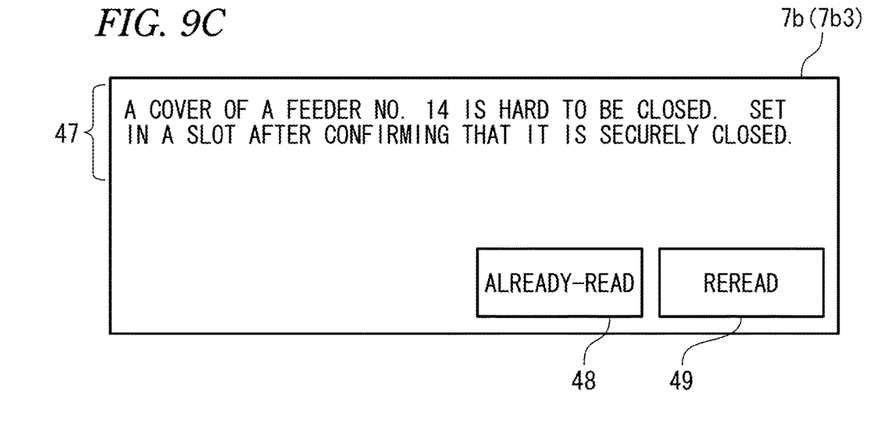

FIG. 9C shows a message display window 7b3 which displays a message to which an expiration time has not been set, i.e., a message whose notification setting is "manual". In the message display window 7b3, both the "already-read" 48 and the "reread" 49 are in an active state. More specifically, this is a display aspect in which an operator can make his/her own decision regarding which of the "already-read" 48 or the "reread" 49 is to be selected. When displaying the message with the display aspect of the message display window 7b3, the message display processing section 24 changes the state of the message concerned from "unread" to "already-read", or from "unread" to "reread" (Step ST26, Step ST27) in response to the operation of the "already-read" 48 or the "reread" 49 by the operator (Step ST25).

When the message is changed to be in a predetermined state at Step ST26 and Step ST27, the message display processing section 24 closes the message display window 7b (Step ST28: a message display window closing step). Then, the message display processing section 24 determines whether the message data 19a in the storage section 19 includes any message which has been set to be "unread" (limited to that related to the mounting line facility concerned) (Step ST29: a presence-of-unread-message determination step). Then, if there is no unread message, the notification is cancelled (Step ST30: a notification cancelling step) to terminate the message display processing. On the other hand, if there is an unread message, the procedure again returns to Step ST22 to repeat the similar processing until there is no unread message remained. Therefore, the message display processing section 24 acts as an unconfirmed message notification section that causes the notification section to carry out a notification that there is an unconfirmed message.

As described above, in the present embodiment, if the operator has not confirmed a message at the starting time in the plural shifts that comes until the expiration time expires, in other words, at the time of notification time, the notification is made such that there is an unconfirmed message. Therefore, it is possible to securely transfer the message also to the operator who will work in the shift subsequent to next one and those which come thereafter after the message has been registered. In the present embodiment, the message transfer apparatus in the electronic component mounting system 1 is structured by the message registration processing section 22, the storage section 19, the message display processing section 24, the notification time setting section 15, the unread setting processing section 16, the display/input section 7, the signal tower 8, the buzzer 9 and the expiration time setting section 23.

Figure 10:
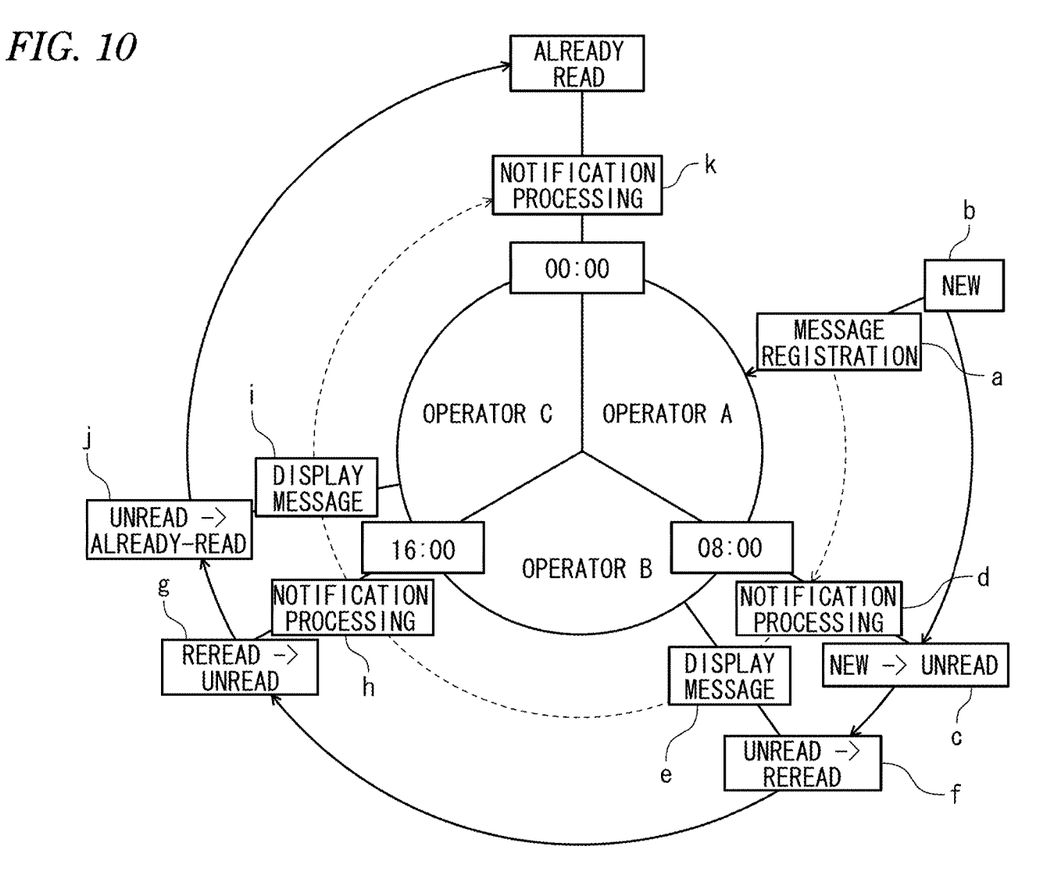
FIG. 10 is an explanatory view showing an example in which the message transfer apparatus in the electronic component mounting system according to the embodiment of the present invention is used in a production site.

Next, a specific example of message transfer conducted in a production site will be described with reference to FIG. 10 in light of the processing described in advance. In the example below, the working arrangement of operators will be three shifts a day, in which an "operator A" takes charge of a shift from "midnight" to "eight", an "operator B" takes charge of a shift from "eight" to "sixteen", and an "operator C" takes charge of a shift from "sixteen" to "midnight", assuming that one message registered by the operator A is needed to be given to the operators B and C. Furthermore, the notification time of the message (the timing where the message is to be confirmed) is set to be "midnight", "eight" and "sixteen" which are the same time as the time to start each shift. It is assumed that the content of the message is only calling attention to the fact that "a cover of a feeder No. 14 (provided in the mounter M3) is hard to close (refer to FIGS. 9A to 9C)".

First, the operator A creates a message through the message registration screen 7a (FIG. 4) displayed on the display/input section 7 of the mounter M3. Then, the "notification setting" 35 is selected to be the "1 rotation (1 day)", followed by operating the "register" 36. In response to this operation, the message registration processing (mark a) is executed in the electronic component mounting system 1 (Step ST1 to Step ST3 shown in FIG. 5). At that time, the state of the message in this shift is set to be "new" (mark b). Furthermore, the expiration time is set to be "midnight" which is the notification time set to be the same time as the timing of starting this shift.

When the time "eight" has come, the operator A changes the shift with the operator B. Furthermore, since "eight" is the time which is set as the timing of confirming the message, the unread setting processing section 16 extracts the message registered by the operator A so as to set the state of the message from "new" to "unread" (mark c) (Step ST11 and Step ST12 shown in FIG. 7). Then, the notification processing (mark d) to the mounter M3 is conducted based on the presence of the unread message (Step ST13 and Step ST14 shown in FIG. 7). In response thereto, the mounter M3 makes a notification due to the presence of the unread message (Step ST21 and Step ST22 shown in FIG. 8).

The operator B who has recognized the presence of the unread message by the aforementioned notification makes a request for displaying the message through the display/input section 7. In response thereto, the message display processing section 24 displays the message of interest on the message display window 7b (mark e) (Step ST23 and Step ST24 shown in FIG. 8). At this time, since the expiration time of the message is not "sixteen" which is the next notification time, the display/input section 7 displays the message display window 7b1 in which only the "reread" 49 is in an active state (FIG. 9A). The operator B confirms the message, and then operates the "reread" 49. In response thereto, the state of the message is changed from "unread" to "reread" (mark f) (Step ST25 and Step ST27 shown in FIG. 8), and then the message display window 7b1 is closed (Step ST28 shown in FIG. 8). In addition, since there is no other unread message in this example, the mounter M3 terminates the notification (Step ST29 and Step ST30 shown in FIG. 8).

When the time "sixteen" has come, the operator B changes the shift with the operator C. Furthermore, since "sixteen" is the notification time which is set as the timing where the message is to be confirmed, the unread setting processing section 16 again extracts the message in the "reread" state which has been registered by the operator A to set the state of the message from "reread" to "unread" (mark g) (Step ST11 and Step ST12 shown in FIG. 7). Then, the notification processing (mark h) to the mounter M3 is conducted based on the presence of the unread message. Then, the mounter M3 makes a notification due to the presence of the unread message.

The operator C who has recognized the presence of the unread message upon receiving the aforementioned notification makes a request for displaying the message. In response thereto, the message display processing section 24 displays the message of interest on the message display window 7b (mark i). At this time, since the expiration time of the message is "midnight" which is the next notification time, the display/input section 7 displays the message display window 7b2 in which only the "already-read" 48 is in an active state (FIG. 9B). The operator C confirms the message, and then operates the "already-read" 48. In response thereto, the state of the message is changed from "unread" to "already-read" (mark j) (Step ST25 and Step ST26 shown in FIG. 8), and then the message display window 7b2 is closed. Then, the mounter M3 terminates the notification.

As described above, the message transfer apparatus in the electronic component mounting system 1 according to the present embodiment is used, so that it is possible to register a message by the operator A, followed by securely transferring it also to the operator C who will work in the shift subsequent to next one. In this manner, the message that is to be notified includes the message to be given to the current operator (operator C) which has been output at the message display processing section 24 (a message output section) and already transferred to the other operator (operator B).

When the time "midnight" has come, the operator C changes the shift with the operator A. Furthermore, since "midnight" is the time which has been set as the timing where the message is to be confirmed, the processing by the unread setting processing section 16 (Step ST11 and Step ST12) is conducted. However, the message is excluded from the target of extraction by the unread setting processing section 16 because it is changed to be in the "already-read" state in the previous processing. Therefore, no notification processing (mark k) is conducted to the mounter M3, and also no notification about the fact that the message has been unread is made to the operator A who has registered the message. In this manner, the expiration time is defined on the message and no notification processing is conducted regarding the message whose expiration time has been expired, so that receiving an unnecessary notification can be prevented for operators, such as a person who has registered the message by himself, or a person who is not necessary to receive the message.

Next, a brief explanation will be made regarding the case of employing the notification setting of "next shift" in the example shown in FIG. 10. When the operator A registers the message between "midnight" and "eight", the expiration time is set to be "sixteen" which corresponds to the notification time subsequent to next one after the registration. Therefore, when the operator B in the next shift makes a request for displaying the message, the display/input section 7 displays the message display window 7b2 in which only the "already-read" 48 is in an active state (FIG. 9B). The operator B confirms the message, and then operates the "already-read" 48, thereby changing the state of the message from "unread" to "already-read". The message entered into the "already-read" state is not extracted by the unread setting processing section 16 at "sixteen" which is the next notification time. Therefore, neither the notification processing nor the notification to the operator C is conducted at "sixteen". In this manner, the registered message is notified only to the operator in the next shift by employing the notification setting of "next shift".

Finally, a brief explanation will be made regarding the case of employing the notification setting of "manual" in the example shown in FIG. 10. When the operator A registers the message between "midnight" and "eight", the notification processing of the message is conducted at "eight" which corresponds to the next notification time. Then, when the operator B in the next shift makes a request for displaying the message, the display/input section 7 displays the message display window 7b3 in which both the "already-read" 48 and the "reread" 49 are in an active state (FIG. 9C). Here, if the operator B operates the "already-read" 48, the notification processing of the message is not conducted at "sixteen" which is the next notification time. On the other hand, if the "reread" 49 is operated, the notification processing of the message is conducted at "sixteen". Then, the message display window 7b3 shown in FIG. 9C is again displayed by a request made by the operator C for displaying the message. In this manner, the presence of the notification on the message to the next shift is determined by the operator who works in each shift.

As described above, according to the electronic component mounting system 1 of the present embodiment, the message that is to be notified is extracted at the timing where the notification on the message is to be issued, and the notification section is caused to carry out the making of a notification regarding the presence of an unconfirmed message if there is any message in the extracted messages which has not been output by the message output section. Therefore, the message can be securely given to not only the operator who will work in the shift immediately next to that in which the message has been registered, but the operator who will work in the shift subsequent to next one and those coming thereafter. Namely, the embodiment provides a remarkable effect under the working system in which three or more operators work in turn in a day. In such a case, at least three notification times are set.

The present invention is not limited to the embodiment described above. For example, the message registration function may be provided on the side of the host system 3 to create and register the message in the host system 3. Furthermore, the mounting lines 4A and 4B may have a plurality of arrangements of any mounting line facility, and the message transfer function may be incorporated only into any mounting line facility. Furthermore, the "display section" to which the message output section outputs the message is not limited to the display/input section 7 fixed in the mounting line facilities M2 to M6, but may be a portable display apparatus and the like which is carried by the operator in charge of the mounting line facility concerned. Furthermore, although the explanation has been made taking "notification time" as an example of the timing where the notification on the message is to be made, any method, such as "five minutes after the time of changing the shift", may be taken as long as it is a method capable of defining the timing where the notification on the message is to be issued. Furthermore, a plurality of timings where the message is to be notified may be set within one shift. For example, it may be set after the break time in the shift, or every few hours. Furthermore, other notification section than the display/input section 7, the signal tower 8, or the buzzer 9 which are provided in the mounting line facilities M2 to M6 may be used. A portable communication apparatus, or a monitor for information communication and a public-address system provided in a factory may be used.

According to the embodiments of the present invention, it is possible to securely transfer a message to an operator, and the embodiments are quite beneficial in the field of mounting electronic components.

What is claimed is:

1. An electronic component mounting system, comprising a plurality of mounting lines for mounting electronic components on a board and a message transfer apparatus communicatively connected to each of the plurality of mounting lines,
    wherein each of the plurality of mounting lines comprises:
        a printer for printing a paste on an electrode formed on the board;
        mounters for placing the electronic components on the board, and
    wherein the message transfer apparatus comprises;
        a message registration section that registers a message;
        a message storing section that stores the message registered by the message registration section;
        a display section that displays the message stored in the message storing section; an input section that selectively changes a state of an unread message to a reread state or an already-read state;
        a message output section that outputs the message stored in the message storing section to the display section;
        a message notification timing setting section that sets a plurality of timings where the message is to be notified in accordance with timings for an operator in charge of the electronic component mounting system to be shifted with another operator;
        a message-to-be-notified extraction section that extracts a message to be notified, including a new message and a reread message, from the message storing section at a timing where the message is to be confirmed and sets both the new message and the reread message of the extracted message to be the unread message; and
        an unconfirmed message notification section that causes a notification section to carry out a notification regarding presence of an unconfirmed message when there is any message which has not been output by the message output section among the extracted message extracted by the message-to-be-notified extraction section,
    wherein the reread message is a message that is currently in an unread state and then changed directly to the reread state in response to an operation input through the input section.

2. The electronic component mounting system according to claim 1, wherein the message that is to be notified includes a message output by the message output section to be transferred to another operator, the message being to be transferred to the current operator.

3. The electronic component mounting system according to claim 2, the apparatus further comprising:
    an expiration time setting section that sets an expiration time of message for each message; and
    a message setting section that sets a message, from among messages output by the message output section, with an expiration time that will expire at the next timing where the message is to be confirmed not to be extracted as a message that is to be notified by the message-to-be-notified extraction section.

4. The electronic component mounting system according to claim 1, the apparatus further comprising:
    an expiration time setting section that sets an expiration time of message for each message; and
    a message setting section that sets a message, from among messages output by the message output section, with an expiration time that will expire at the next timing where the message is to be confirmed not to be extracted as a message that is to be notified by the message-to-be-notified extraction section.

5. The electronic component mounting system according to claim 1,
    wherein the message-to-be-notified extraction section extracts a message that is already output by the message output section and set to be the unread message by the message-to-be-notified extraction section.

6. The electronic component mounting system according to claim 1, wherein the message to be notified includes only the new message and the reread message.

* * * * *